Dec. 12, 1933.  H. W. TETER  1,939,325
ANTISLIP BELT PULLEY
Filed May 21, 1930

Inventor
Howard W. Teter
By Stryker & Stryker
Attorneys

Patented Dec. 12, 1933

1,939,325

UNITED STATES PATENT OFFICE 1,939,325

ANTISLIP BELT PULLEY

Howard W. Teter, St. Paul, Minn.

Application May 21, 1930. Serial No. 454,290

3 Claims. (Cl. 64—17.6)

This invention relates to pulleys, particularly although not exclusively, adapted for use on railway cars to drive a generator or other mechanism from the car axle.

In cold weather the pulleys heretofore employed, in exposed positions, on car underframes have given much trouble because of the unavoidable deposit of frost, snow or ice which deposit so reduces friction that the belts slip and the drive wholly or partially fails. The present invention efficiently overcomes this difficulty by insuring proper frictional engagement between the belt and pulley even under the most adverse conditions.

Figure 1:
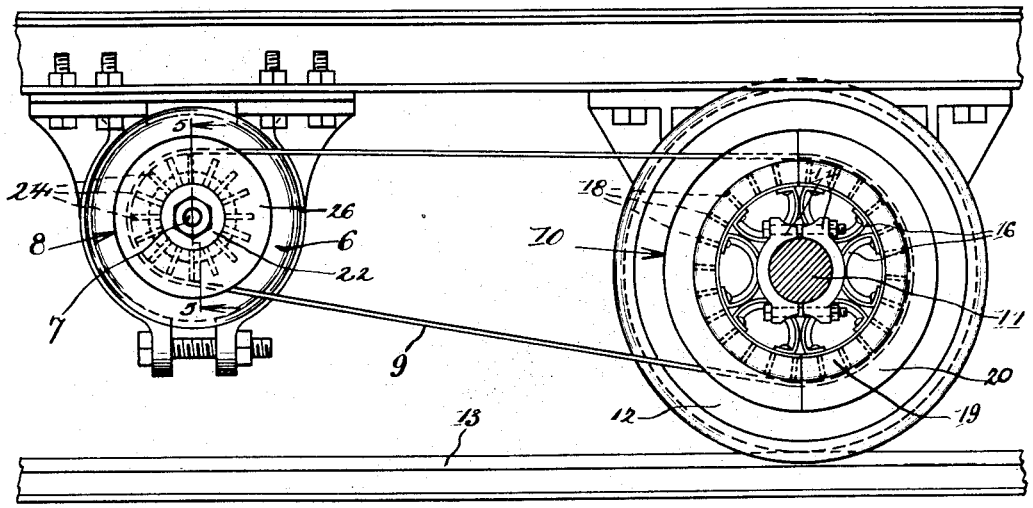
Figure 3:
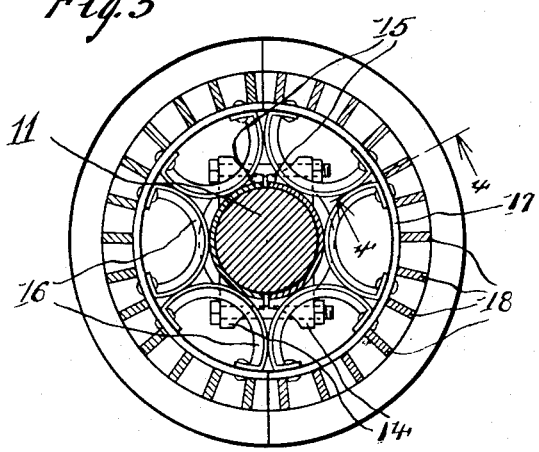
Figure 2:
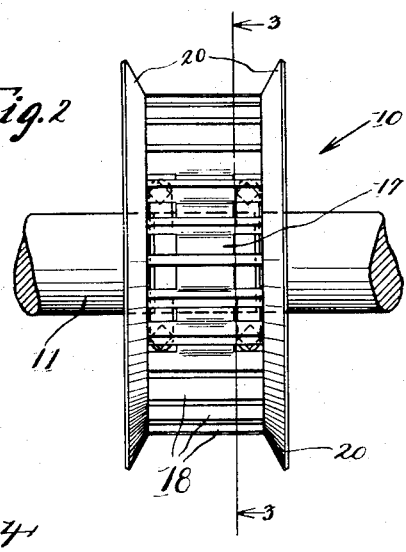
Figure 5:
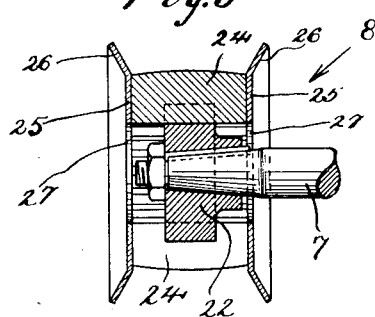
Figure 4:
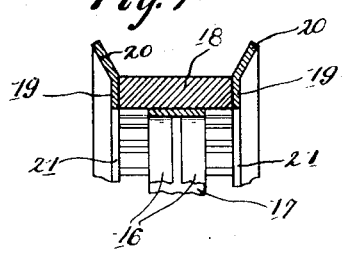

The invention will be best understood by reference to the accompanying drawing in which Figure 1 is a side elevation of a pair of my improved pulleys as employed in driving a car generator, portions of the car and generator being shown diagrammatically; Fig. 2 is a plan view of the axle pulley with a fragmentary portion of the axle; Fig. 3 is a section through said pulley taken on the line 3—3 of Fig. 2; Fig. 4 is a fragmentary section taken on the line 4—4 of Fig. 3; Fig. 5 is a central vertical section through the generator pulley, together with a fragmentary portion of the generator shaft, taken on the line 5—5 of Fig. 1 and Fig. 6 is a side elevation of the hub of the generator pulley.

As shown in Fig. 1, a generator 6 has a shaft 7 adapted to be driven by a small pulley 8 embodying my improvements. A belt 9 which engages the periphery of the pulley 8 is adapted to be driven by a larger, axle pulley 10 mounted on the car axle 11. A car wheel is indicated by the numeral 12 and the supporting rail by the numeral 13.

The pulley 10 is made in two parts and has clamp members 14 adapted to grip the axle 11. Secured to the clamp members 14 are sleeve members 15 to which, in turn, are secured a series of spokes or spacing members 16. An annular band 17 is rigidly fastened to the outer ends of the spacing members 16. As best shown in Figs. 2 and 4, this band 17 is substantially narrower than the periphery of the pulley. A multiplicity of blade-like members 18 extend radially outward from the band 17, being welded or otherwise rigidly fastened thereto. At each face of the pulley a ring 19 is welded to the ends of the blade-like members 18 and has integral flanges 20 which project from the periphery of the pulley to guide the belt 9. The face of the belt engages only the outer edges of the members 18 and these blades, at their edges, are preferably not thicker than about one-quarter of an inch and are spaced apart, around the periphery of the pulley, a distance several times their thickness. Belt-engaging members about three-sixteenths of an inch thick have been used successfully. The open spaces between the members 18 communicate freely with the annular openings 21 around the axle 11 at each face of the pulley so that in use the rapid rotation of the blades creates an outward draft of air between them at the portion of the pulley periphery where the belt does not cover the openings.

Figure 6:
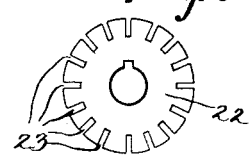

The smaller pulley 8 has a hub member 22 adapted to be secured to the generator axle 7 and this hub member, as best shown in Fig. 6, is formed with radial grooves 23 to receive blade-like members 24 for engaging the belt. The members 24 extend radially outward in spaced relation to each other around the periphery of the pulley and are thin and relatively widely spaced, as in the case of the members 18 of the axle pulley. Face plates 25 are secured to the ends of the members 24 and have guide flanges 26 integral with their outer peripheries. Central openings 27 adjacent to the shaft 7 permit the intake of air drafts which pass radially outward between the members 24 when in operation.

In use, as will now be readily understood, the belt 9 runs upon the outer edges of the blade-like members 18 and 24 so that the relatively small surfaces of contact between the pulley and belt are subject to relatively high pressure. This pressure is sufficient to force the edges of the members 18 and 24 through any substances of friction-reducing nature, such as frost, snow or ice. The relatively wide spaces between the blade-like members allows the ready escape of such friction reducing substances and the loosened particles are thrown outward from between said members by centrifugal force aided by the drafts of air created by the rotating members. It has been found that my improved pulleys insure proper frictional drive even in the coldest weather and under conditions where the old types of pulleys have wholly failed. Thorough tests have further shown that the relatively small surfaces of contact between the belt and pulleys do not cause excessive wear on the belt but, on the contrary, the resulting elimination of slipping prolongs the life of the belt.

Having described my invention what I claim as new and desire to protect by Letters Patent is:

1. In a belt pulley, a multiplicity of spaced, blade-like members arranged to engage the belt with their outer edges, and having relatively wide, open spaces between them to allow the escape of friction-reducing substances and said edges being not greater than about one-quarter of an inch in width and each blade-like member having relatively wide, exposed faces extending substantially radially to create an outward draft of air between said members.

2. A belt pulley adapted to be secured to an axial shaft comprising, a multiplicity of blade-like members, spaced around the periphery of the pulley to engage the belt at their outer edges, said blade-like members constituting the sole bearing for the face of the belt, and a face member having an opening therein adjacent to the axial shaft, the spaces between said blade-like members communicating freely with said opening to allow the escape of friction reducing substances and each blade-like member having a wide, exposed face extending substantially radially.

3. A belt pulley adapted to be secured to an axial shaft comprising, a multiplicity of blade-like members, spaced around the periphery of the pulley to engage the belt at their outer edges, and a face member having an opening therein adjacent to the axial shaft, the spaces between said blade-like members communicating freely with said opening and said blade-like members having wide, exposed faces extending substantially radially to create an outwardly directed draft of air between them to remove loose particles of friction reducing substances when the pulley is rotated.

HOWARD W. TETER.